United States Patent [19]

Edelman

[11] 4,380,425

[45] Apr. 19, 1983

[54] CAULKING SPOUT

[76] Inventor: David J. Edelman, 142 Flanders-Netcong Rd., Flanders, N.J. 07836

[21] Appl. No.: 234,597

[22] Filed: Feb. 17, 1981

Related U.S. Application Data

[63] Continuation-in-part of Ser. No. 46,561, Jun. 7, 1979, abandoned.

[51] Int. Cl.[3] .......... B29F 3/04

[52] U.S. Cl. .......... 425/458; 401/265

[58] Field of Search .......... 222/541, 566–570, 222/572, 325; 401/DIG. 3, 132, 133, 134, 137, 139, 261, 266, 265; 425/87, 458

[56] References Cited

U.S. PATENT DOCUMENTS

| | | | |
|---|---|---|---|
| 2,559,553 | 7/1951 | Wolff | 401/266 X |
| 2,988,775 | 6/1961 | Painter et al. | 401/266 X |

*Primary Examiner*—Allen N. Knowles

*Attorney, Agent, or Firm*—Ronald G. Goebel

[57] ABSTRACT

An applicator for applying sealing compounds such as caulking is provided having a tubular spout, an inlet opening which communicates with the sealing compound and an outlet orifice. A finger-shaped applicator tip extends longitudinally outward while angled inwardly of the spout and has an oval cross-section in the vicinity of the outlet which makes the outlet orifice crescent-shaped.

3 Claims, 9 Drawing Figures

CAULKING SPOUT

This application is a continuation-in-part of U.S. patent application Ser. No. 046,561, filed June 7, 1979, now abandoned.

BACKGROUND OF THE INVENTION

This invention relates to an applicator spout for standard caulking cartridges.

In the past the application of viscous sealing compounds such as caulking and the like to joints or seams has been accomplished through the use of a cartridge containing the sealing compound connected with a spout consisting of a tapered hollow tube having an outlet orifice of circular cross-section. Pressure is applied to the cartridge usually by means of a gun mechanism which causes compound to be ejected through this orifice onto the seam or joint. The compound exudes beyond the width of the outlet orifice and, to a great extent, is not uniformly directed to the seam or joint to be sealed, that is, a large portion of the exuded compound coats the members forming the seam rather than the seam itself. The user must attempt to direct the compound into the seam or joint by use of his finger or similar shaped tool after the compound has been applied, thereby making the application a two-step method.

The present invention, solves this problem by providing an applicator spout for sealing compounds which, in one step, permits simultaneous application and tamping or pressing the compound into the seam or joint to form a uniform, neat and tight seal.

SUMMARY OF THE INVENTION

The applicator comprises a tubular spout made of plastic or other similar rigid material having an inlet opening which communicates with the sealing compound housed, for example, in a container or cartridge and an outlet orifice. A finger-shaped applicator tip extends longitudinally outward and is angled inwardly of the spout. The applicator tip is substantially oval in cross-section in the vicinity of the outlet and becomes circular at its extremities. Such oval cross-section of the tip causes the outlet orifice to become crescent-shaped. When used in the application of sealing compound, the compound is forced through the crescent-shaped orifice and contacts the inwardly angled portion of the applicator tip. The tip simultaneously presses the compound into the seam to be sealed to provide a uniform and tight bead in one step.

DETAILED DESCRIPTION OF THE PREFERRED EMBODIMENTS

Figure 1:
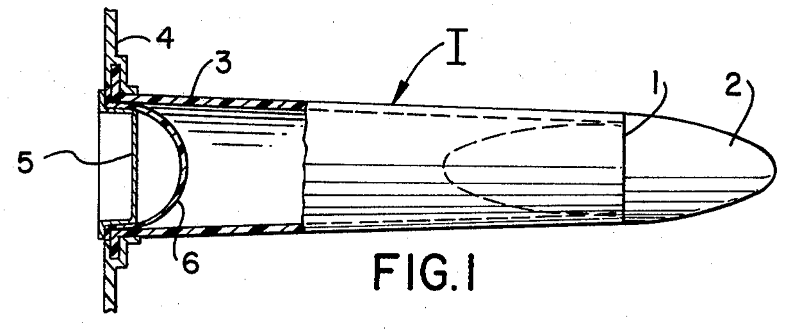
FIG. 1 is a bottom view of a spout according to the invention attached to a standard cartridge.
Figure 2:
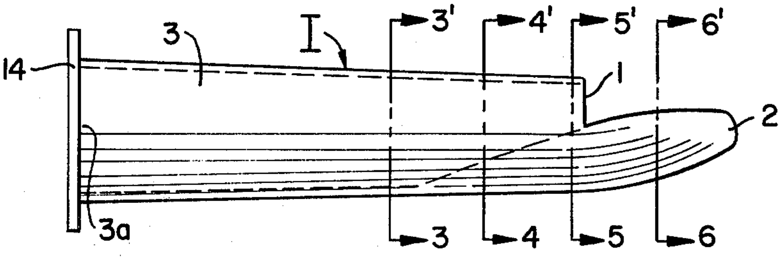
FIG. 2 is a side view of the spout of FIG. 1 showing the protruding finger-shaped applicator tip.

Referring now to the drawings, there is shown a tubular spout I mounted on a caulking compound cartridge 4, which spout comprises a molded plastic body 3 having an inlet opening 3*a*, retainer 5 and an outlet orifice 1. The spout may be molded of polyethylene or a similar plastic and may have a seal 6 to retain the caulking compound within the cartridge 4.

Figure 3:
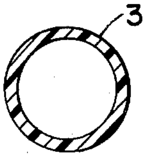
FIGS. 3 to 6 are sections through lines 3—3′, 4—4′, 5—5′ and 6—6′, respectively showing the tubular portion of the spout from a point inwardly of the applicator tip to the forward portion of the applicator tip.
Figure 4:
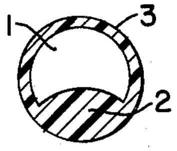
Figure 5:
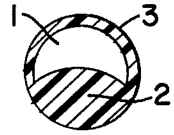
Figure 6:
Figure 7:
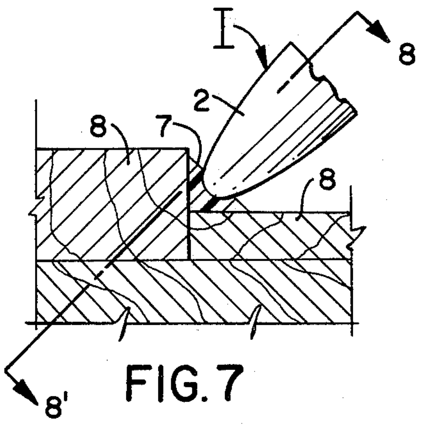
FIG. 7 is a side view of the applicator finger being used in applying caulking compound to a seam.
Figure 8:
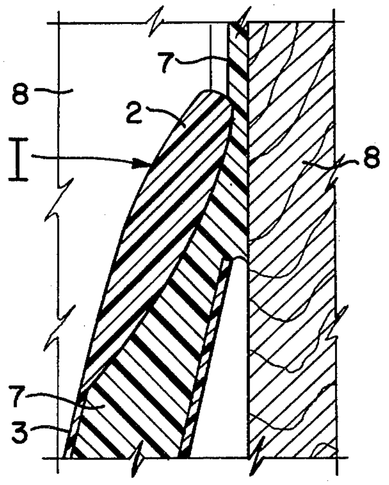
FIG. 8 is a sectional view in a vertical plane through line 8—8′ showing the applicator finger applying caulking compound.
Figure 9:
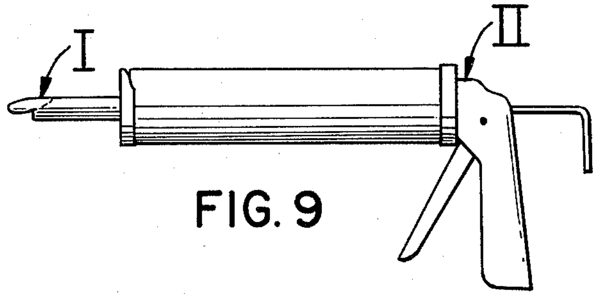
FIG. 9 is a side view showing the entire spout connected with a standard caulking gun.

The spout has a solid finger-shaped applicator tip 2 which extends longitudinally from inside the wall of the spout I inwardly of the outlet orifice 1 to a point outwardly of the orifice and at an inwardly angled position with respect to said spout. The applicator tip can be formed integrally with the spout. The cross-sectional configuration of the applicator tip 2 and its effect on changing the cross-sectional configuration of the spout in the area of the outlet orifice 1 is shown in FIGS. 3 to 6. FIG. 3 shows the circular cross-section of the tubular portion of the spout. FIG. 4 shows the cross-section of the spout and applicator tip at a point about midway between the inward extension of the applicator tip and outlet orifice 1. As can be seen from FIG. 4, the applicator tip is substantially oval in cross-section and provides a crescent-shaped opening to that portion of the spout inward of the orifice. FIG. 5 is a cross-section of the spout near the outlet orifice 1. The oval cross-section of the applicator tip 2 is larger than in FIG. 4 which causes the formation of a smaller, crescent-shaped opening of the spout at the outlet orifice than in FIG. 4. FIG. 6 shows a circular cross-section of the applicator tip at a point midway between the outlet orifice and outer extremity of the applicator tip. The outer and inner ends of the applicator tip converge inwardly on both sides of the orifice 1 as shown in FIGS. 1, 7 & 8. Thus, the oval shape of the applicator tip provides a progressively diminishing crescent-shaped passageway in the vicinity of the outlet orifice of the spout.

In using the spout to apply caulking compound, as shown in FIGS. 7 & 8, the seal 6 to the cartridge containing caulking compound 7 is first broken. The applicator tip 2 is placed in a seam defined by abutting members 8. The spout and cartridge is then pulled along the seam in a manner while caulking compound is forced into the spout. The compound is forced through the crescent-shaped output orifice and contacts the inwardly angled portion of the applicator tip. The tip simultaneously presses the compound 7 into the seam to provide a uniform and tight application of caulking compound to the seam.

I claim:

1. An applicator for sealing compounds comprising a tubular spout having an inlet opening and an outlet orifice, an applicator tip formed integrally with said applicator extending from inside said spout inwardly of said outlet orifice to a point outwardly of said outlet orifice and being angled inwardly of said spout, the outer end of said tip converging inwardly and having a substantially oval cross-section in the vicinity of said outlet orifice to form a finger-like projection and forming a crescent-shaped opening at said outlet orifice.

2. An applicator for sealing compound comprising a tubular spout having an inlet opening and an outlet orifice, an applicator tip extending from inside said spout inwardly of said outlet orifice to a point outwardly of said outlet orifice and being angled inwardly of said spout, said applicator tip having a substantially oval cross-section in the vicinity of said outlet orifice, thereby forming a crescent-shaped opening at said outlet orifice.

3. The applicator of claim 2 wherein said applicator tip is made integrally with said spout.

* * * * *